(12) United States Patent
Sakahashi et al.

(10) Patent No.: US 8,783,571 B2
(45) Date of Patent: Jul. 22, 2014

(54) DEVICE AND ITS USE FOR OUTPUTTING OF 2D CODES WITH EMBEDDED IMAGES

(75) Inventors: Koji Sakahashi, Tokyo (JP); Bryan Scott Schaffner, La Jolla, CA (US)

(73) Assignee: 4GQR LLC, Austin, TX (US)

( * ) Notice: Subject to any disclaimer, the term of this patent is extended or adjusted under 35 U.S.C. 154(b) by 194 days.

(21) Appl. No.: 13/286,137

(22) Filed: Oct. 31, 2011

(65) Prior Publication Data
US 2013/0026239 A1     Jan. 31, 2013

(30) Foreign Application Priority Data

Jul. 25, 2011     (JP) ................................ 2011-174335

(51) Int. Cl.
*G06K 7/10*     (2006.01)
*G06K 19/06*     (2006.01)

(52) U.S. Cl.
USPC ..................................... 235/462.01; 235/494

(58) Field of Classification Search
USPC ........... 235/494, 375, 462.01, 462.09–462.11
See application file for complete search history.

(56) References Cited

U.S. PATENT DOCUMENTS

| | | | | |
|---|---|---|---|---|
| 4,777,357 A * | 10/1988 | Harada et al. | ............ | 235/462.27 |
| 4,823,194 A * | 4/1989 | Mishima et al. | ............ | 382/190 |
| 4,889,367 A * | 12/1989 | Miller | ............ | 283/88 |
| 5,337,361 A * | 8/1994 | Wang et al. | ............ | 380/51 |
| 5,900,954 A * | 5/1999 | Katz et al. | ............ | 359/2 |
| 6,669,087 B2 * | 12/2003 | Wiklof et al. | ............ | 235/383 |
| 7,025,269 B2 * | 4/2006 | Marshall | ............ | 235/462.01 |
| 7,028,902 B2 * | 4/2006 | Xu et al. | ............ | 235/462.1 |
| 7,337,972 B2 * | 3/2008 | Lubow | ............ | 235/462.25 |
| 8,144,922 B2 * | 3/2012 | Kawabe et al. | ............ | 382/100 |
| 8,510,368 B2 * | 8/2013 | Chor | ............ | 709/202 |
| 2004/0075869 A1 * | 4/2004 | Hilton et al. | ............ | 358/3.28 |
| 2005/0109846 A1 * | 5/2005 | Lubow | ............ | 235/462.01 |
| 2005/0274804 A1 * | 12/2005 | Matsumoto | ............ | 235/462.01 |
| 2007/0215685 A1 * | 9/2007 | Self et al. | ............ | 235/375 |
| 2009/0255992 A1 * | 10/2009 | Shen | ............ | 235/462.1 |
| 2011/0283196 A1 * | 11/2011 | Berger et al. | ............ | 715/738 |
| 2012/0048927 A1 * | 3/2012 | Hasegawa | ............ | 235/383 |
| 2013/0026241 A1 * | 1/2013 | Sakahashi et al. | ............ | 235/494 |
| 2013/0093773 A1 * | 4/2013 | DeRoller et al. | ............ | 345/467 |
| 2013/0112760 A1 * | 5/2013 | Schory et al. | ............ | 235/494 |

FOREIGN PATENT DOCUMENTS

| | | | | |
|---|---|---|---|---|
| JP | 2006302050 A | * | 11/2006 | |
| JP | 2007034998 A | * | 2/2007 | |
| JP | 2008262521 A | * | 10/2008 | |
| JP | 2009151700 A | * | 7/2009 | |

* cited by examiner

*Primary Examiner* — Michael G Lee
*Assistant Examiner* — Suezu Ellis
(74) *Attorney, Agent, or Firm* — Payam Moradian

(57) ABSTRACT

Provided is a device (and program) for producing a 2D code with an embedded image for an automated machine generated process, comprising a processor that produces the 2D code with an embedded image. Also provided are methods of using this device to produce 2D codes with embedded images.

51 Claims, 12 Drawing Sheets

FIG. 12

Original URL:
http://www.example.com/products/books/example-book.php?trackingcode=campaign987

Shortened URL:
ex 1) http://www.example.com/p123    ◄······ Shorten
ex 2) http://ex.jp/shtn4    ◄······ Shorten

FIG. 13

Type A or B can be selected, according to the number of characters to be encoded.

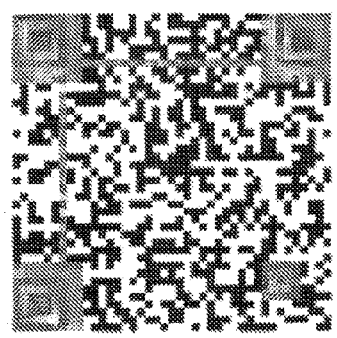

Type A

Less than 50 characters
center alignment: possible

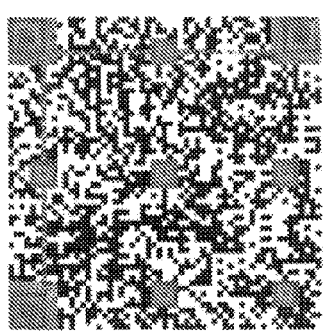

Type B

Less than 100 characters
center alignment: impossible

※ An embedding image cannot be laid out on the gray-painted area.

DEVICE AND ITS USE FOR OUTPUTTING OF 2D CODES WITH EMBEDDED IMAGES

CROSS-REFERENCE

This Application claims the benefit of Japanese Appl. No. 2011-174335, filed on Jul. 25, 2011, whose content is incorporated herein by reference in its entirety.

FIELD OF THE INVENTION

This invention is regarding a device which outputs 2D codes.

BACKGROUND OF THE INVENTION

There are many types of standardized 2D codes. Therefore, the general 2D codes in use are output according to specifications in a specification document or a standards document. The 2D codes appear only as random mosaic patterns, by visual examination. Therefore, without conducting readout processing (decoding of the 2D codes), it is not possible to infer the encoded information. In JP2007-34998, a technology is disclosed to embed black and white graphics as desired into 2D codes, with assurance of the quality of the readout of the 2D codes. However, in JP2007-34998, it is not possible to embed colored graphics into 2D codes. Further, in JP2007-34998, it is not possible to designate the alignment location or alignment size intended to be embedded. Therefore, there is a need in the art for an automated machine generated process that does not have the drawbacks of the art.

SUMMARY OF THE INVENTION

The invention's representative configuration is a calculator or device comprised of a processor, memory and interface, a first processing to obtain information to be encoded for a 2D code and obtain graphic data to be embedded into the same 2D code, a second processing to encode the previously obtained information to generate a 2D code, a third processing to adjust the alignment location and the alignment size of the graphic data previously obtained, a fourth processing to follow the adjusted alignment location and the alignment size, tentatively aligning based on the previously generated 2D code, a fifth processing to calculate the error rate of the tentatively aligned 2D code based on the previously described graphic data, a sixth processing to reduce the aforementioned error rate to be equal to or below the threshold value, repeating the third to the fifth processing, and a seventh processing to determine the aforementioned graphic data's alignment location and alignment size by referring to the error rate previously calculated. According to this invention, it is possible to designate the alignment location and the alignment size to embed colored or black and white graphic data into a 2D code.

In one embodiment, the present invention provides a device or calculator for producing a 2D code with an embedded image for an automated machine generated process, comprising a processor that produces the 2D code with an embedded image. Producing the 2D code with an embedded image can comprise: i) obtaining character string information to be encoded for a 2D code and graphic data to be embedded in the described 2D code; ii) generating a 2D code by encoding the obtained information; iii) adjusting the alignment location and the alignment size of the obtained graphic data in the generated 2D code; and iv) calculating the error rate of the 2D code which has the graphic data tentatively aligned, and if necessary repeating the third to the fourth steps until the described error rate becomes equal to or lower than the threshold value. Producing the 2D code with an embedded image can comprise: i) obtaining character string information to be encoded for a 2D code and graphic data to be embedded in the described 2D code, ii) generating a 2D code by encoding the obtained information; iii) adjusting the alignment location and the alignment size of the obtained graphic data in the generated 2D code, iv) tentatively aligning the obtained graphic data in the generated 2D code, according to the adjusted alignment location and alignment size, v) calculating the error rate of the 2D code which has the graphic data tentatively aligned, vi) repeating the third to the fifth steps until the described error rate becomes equal to or lower than the threshold value, vii) determining the alignment location and the alignment size of the graphic data by referring to the calculated error rate. The device can further align the graphic data in the generated 2D code, based on the determined alignment location and alignment size of the graphic data, and output the 2D code which has the image aligned. Producing the 2D code with an embedded image can comprise: i) an interface and memory for receiving character string information and graphic data ii) a processor for encoding the character string information into a 2D code, generating the alignment location for the graphic data, adjusting the alignment location for the graphic data, regenerating the alignment location for the graphic data to reduce the error rate in the generated 2D code, and outputting the generated 2D code with an embedded image according to the alignment location. The step of regenerating the alignment location is repeated until the error rate is equal to or greater than a threshold value. The device can tentatively align binarized graphic data in the aforementioned 2D code instead of the graphic data in the fourth step (iv), and further binarize the pixels of the bright and dark areas in the obtained graphic data or image. The device can binarize the graphic data using a threshold value. The device can calculate an error rate, using the tentatively aligned and binarized graphic data in the generated 2D code to determine each pixel to be valid or invalid. The error rate can be calculated based on pixels for 2D codes. For a QR code, the pixels form cells and it is preferred to do an error calculation based on the position for the cells. The "cell" is the minimum structural unit in a QR code. In other words, it is a smallest component of a QR code. It is a black or white square that is the minimum constituent of a QR code. A standard QR code consists of certain number of black and white cells.

The step of generating graphic data can comprise binarizing the graphical data using a threshold value. The device can further determine whether the alignment location or the alignment size has priority, and, in the third step, to adjust the alignment location and alignment size of the obtained graphic data in the generated 2D code, based on the outcome. The device can determine if the obtained graphic data is aligned in comparison to area for decoding of the generated 2D code, and referring to the error rate calculated in the sixth step, to determine the outcome. The device can further determine whether the generated 2D code with an embedded image can be decoded prior to output. The device can optionally further carry out transmissive processing before or after the graphic data is tentatively aligned on the 2D code. The 2D code can be generated by first reducing the obtained character string information for a pre-existing 2D code into an encoded form. The reducing can maintain the same information as the pre-existing 2D code. The device can further comprise a memory for storing a program to be executed by a processor and an interface that facilitates viewing a 2D code with an embedded image. The image can be selected from the group consisting at least one of a letter or number or combination, multiple letters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The ratio of space covered by the image compared to the code can be about 1/2 to about 1/12, or about 1/9. This ratio depends on the state of technology of cameras and scanners such as those incorporated in mobile phones and other devices that feature cameras and scanning applications that are web-enabled, this can be 'feature' mobile phones or 'smart' mobile phones including 'computer tablets' that feature a built-in camera and that are web-enabled. The '1/9' size ratio (embedded image to surface area of code) is a preferred embedded to surface area ratio, presuming center alignment, at this moment in time given due to achieving the general 'functionality goal' of optimizing the image as large as possible yet maximizing the readability of the code based on the camera-quality (calculated by average number of Megapixels and the correlated 'readability' of such) of the prevailing number of mobile devices in circulation. The code can have about 0 to about 100 characters or about 0 to about 50 characters. The code can be a QR code. The graphic data can be input in a format selected from the group consisting of jpg, bmp, gif, png, psd, and ai. The image (i.e. graphic data that is output as a 2D code) in a format selected from the group consisting of eps, png, ai, gif, bmp, pdf, psd, jpg, and tiff. The character string information to be encoded for a 2D code or graphic data can be obtained from the Internet or other networks. The graphic data can be uploaded from a computer, mobile phone or any device or cloud (online) storage (such as Flickr) or imported from existing applications (such as from a fixed-Twitter profile picture). The device can take into account the number of characters for the code, size of the image/graphic data and orientation of the image/graphic data to reduce error correction and increase readability of the 2D code. The character string information can include one or more of the following characters: numeric digits, alphabetic characters, symbols (SP, $, %, *, +, −, ., /, :), 8-bit Latin/Kana characters, and Kanji characters.

In another embodiment, the present invention provides a device for producing a 2D code with an embedded image for an automated machine generated process, comprising a processor that produces the 2D code with an embedded image by i) obtaining character string information to be encoded for a 2D code and graphic data to be embedded in the described 2D code, ii) generating a 2D code by encoding the obtained information; iii) embedding an image of a predetermined size and optionally alignment at a predetermined location on the 2D code, wherein the image is of a size and alignment that allows for the code to be decoded properly. The device can generate a plurality of same or different 2D codes with same or different images, wherein all the images embedded on the 2D codes have the same size and alignment. The device can generate both a plurality of same codes and plurality of different codes. The device can generate the same image on a plurality of codes that are different. The device can generate the same image on a plurality of same codes. All images can be produced with the same maximum size possible without substantially diminishing the accuracy of decoding the 2D codes. The ratio of space covered by the image compared to the code can be about 1/3 to about 1/12, or about 1/9. The code can have about 0 to about 100 characters or about 0 to about 50 characters. Tentative alignment and error calculation may not be necessary due to the code and image having predetermined locations. The image can be selected from the group consisting at least one of a letter or number or combination, multiple letters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The code can be a QR code. The device can comprise a memory for storing a program to be executed by a processor, an interface (a screen that displays a code with an embedded image for a user to view) that facilitates viewing a 2D code with an embedded image.

In another embodiment, the present invention provides a program for causing the device as described above to execute a function for producing a 2D code with an embedded image for an automated machine generated process. The program for executing in a device for producing a 2D code with an embedded image can comprise:

receiving character string information and graphic data,
encoding the character string information into a 2D code,
generating the alignment location of the graphic data,
adjusting the alignment location of the graphic data,
regenerating the alignment location and graphical data to reduce the error rate in the embedded 2D code,
outputting the generated 2D code with the embedded image according to the generated alignment location.

In another embodiment, the present invention provides a method for producing a 2D code with an embedded image by an automated machine generated process, comprising embedding an image on the 2D code while allowing the 2D code to be decoded. The method can comprise: i) obtaining character string information to be encoded for a 2D code and graphic data to be embedded in the described 2D code; ii) generating a 2D code by encoding the obtained information; iii) adjusting the alignment location and the alignment size of the obtained graphic data in the generated 2D code; and iv) calculating the error rate of the 2D code which has the graphic data tentatively aligned, and if necessary repeating the third to the fourth steps until the described error rate becomes equal to or lower than the threshold value.

In another embodiment, the present invention provides a method wherein the method comprises: i) obtaining character string information to be encoded for a 2D code and graphic data to be embedded in the described 2D code, ii) generating a 2D code by encoding the obtained information; iii) adjusting the alignment location and the alignment size of the obtained graphic data in the generated 2D code, iv) tentatively aligning the obtained graphic data in the generated 2D code, according to the adjusted alignment location and alignment size, v) calculating the error rate of the 2D code which has the graphic data tentatively aligned, vi) repeating the third to the fifth steps until the described error rate becomes equal to or lower than the threshold value, vii) determining the alignment location and the alignment size of the graphic data by referring to the calculated error rate. The method can comprise an interface and memory for receiving character string information and graphic data, and a processor for encoding the character string information into a 2D code, generating the alignment location and the graphic data, adjusting the alignment location of the graphic data, regenerating the alignment location of the graphic data to reduce the error rate in the embedded 2D code, and outputting the generated 2D code with an image embedded according to the generated alignment location.

In another embodiment, the present invention provides a method for producing a 2D code with an embedded image by an automated machine generated process, comprising:
i) obtaining character string information to be encoded for a 2D code and graphic data to be embedded in the described 2D code;

ii) generating a 2D code by encoding the obtained information; and iii) embedding an image of a predetermined size and optionally alignment at a predetermined location in the 2D code, wherein the image is of a size that allows for the code to be decoded.

In another embodiment, the present invention provides a device for producing a 2D code with an embedded image for an automated machine generated process, comprising a processor that produces the 2D code with an embedded image by:

i) obtaining character string information to be encoded for a 2D code and graphic data to be embedded in the described 2D code;

ii) determining based on the number of characters where graphic data can be placed on the code; and iii) generating a 2D code with an embedded image. The device can block certain positions for placing an image, allowing an image to be placed elsewhere on the code.

The device/system/program allows for the alignment (left, right, center, up, down relative to the 2D code) to be adjusted in one embodiment and fixed in another embodiment. It allows the size of the graphic data to be adjusted (smaller and bigger) utilizing a "fenced area" or "blocked area" to determine the maximum size in one embodiment. In another embodiment, the size of the graphic data is fixed and not adjustable by the user. It allows the size of the graphic data to be fixed yet alignment to not be fixed and vice versa meaning the alignment can be fixed and graphic data size to be adjustable. These different options are provided in terms of automated, machine-driven 2D code creation (both alignment of graphic data and size of graphic data on the code are malleable, both are fixed, or alignment is fixed size is not, or size is fixed and alignment is not.). Regarding both alignment and size being "fixed" (graphic data can be uploaded by a user or imported from a third party site that makes available its Application Protocol Interface), the specific alignment of the graphic data on the 2D code and correlated maximum size of the graphic data can be determined through error-checking or even mathematically and both methods of determining the precise fixed size and alignment can also take into account external factors such as prevailing quality of mobile phone cameras that will be scanning the 2D codes.

BRIEF DESCRIPTION OF THE FIGURES

FIG. 12 illustrates shortening of character string information.

FIG. 13 illustrates the locations on the 2D code that an image can be placed depending on the number of character string information.

DETAILED DESCRIPTION OF THE INVENTION

The present invention provides a device and methods for embedding images in 2D codes. A 2D barcode or simply a 2D code, is a two-dimensional way to represent information. Preferably the 2D code is a QR code ("Quick Response").

Figure 1:
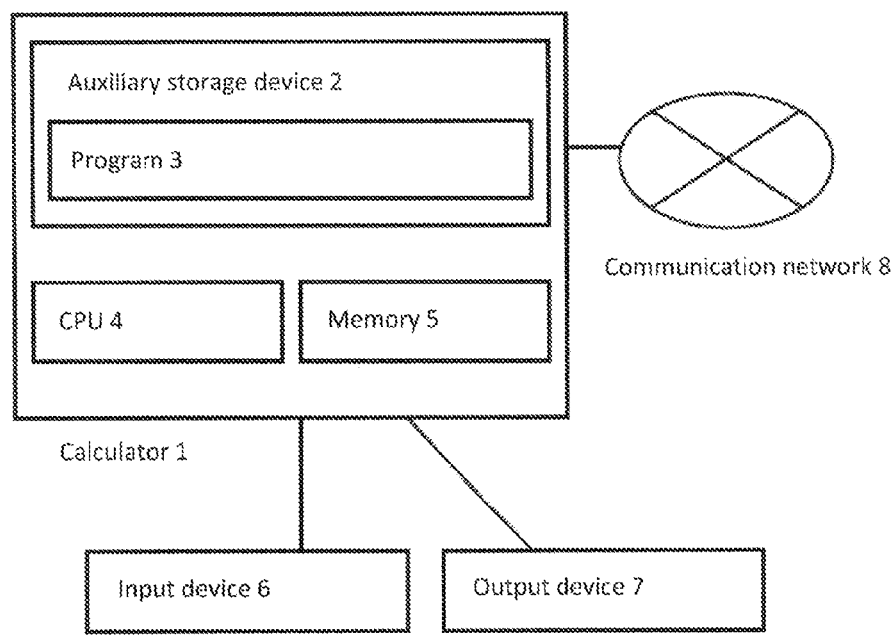
FIG. 1 illustrates the calculator system (device) configuration diagram of the first execution configuration of this invention. It shows the device configuration.

(First execution configuration). FIG. 1 is the calculator system configuration Figure of the first execution configuration of this invention. The calculation system consists of Calculator 1, Input device 6, and Output device 7. It is equipped with CPU 4, Main memory 5, and Auxiliary storage device 2. Auxiliary storage device 2 stores various types of information. Main memory 5 stores programs that execute in CPU 4, and necessary information for CPU 4. CPU 4 executes various types of processings by executing the programs stored in Main memory 5. Furthermore, Calculator 1 is connected to Input device 6 and Output device 7. Various types of information are input from Input device 6. Input device 6 is, for example, a keyboard or a mouse. Output device 7 outputs various types of information. Output device 7 is, for example, a display or a printer. However, Input device 6 and Output device 7 could be part of Calculator 1. Calculator 1 could be connected to Communication network 8. Communication network 8 could also be connected to any other network to which other calculators are connected. For example, Communication network 8 could be the Internet or an intranet.

Main memory 5 stores the 2D code generating program, Program 3. The 2D code generating program, Program 3, executes various processing steps in the execution configuration, by being executed by CPU 4. Specifically, the 2D code generating program, Program 3, reads out the data stored in Auxiliary storage device 2. Further, the 2D code generating program, Program 3, receives information which is input from Input device 6. And the 2D code generating program, Program 3, outputs data through Output device 7. Further, the 2D code generating program, Program 3, sends and receives data to and from other calculators in Communication network 8. Furthermore, the 2D code can be any 2D code, if the code contains information horizontally and vertically. For example, some 2D codes are as follows: QR (Quick response) Code, PDF417, Maxi Code, or Data Matrix.

Figure 2:
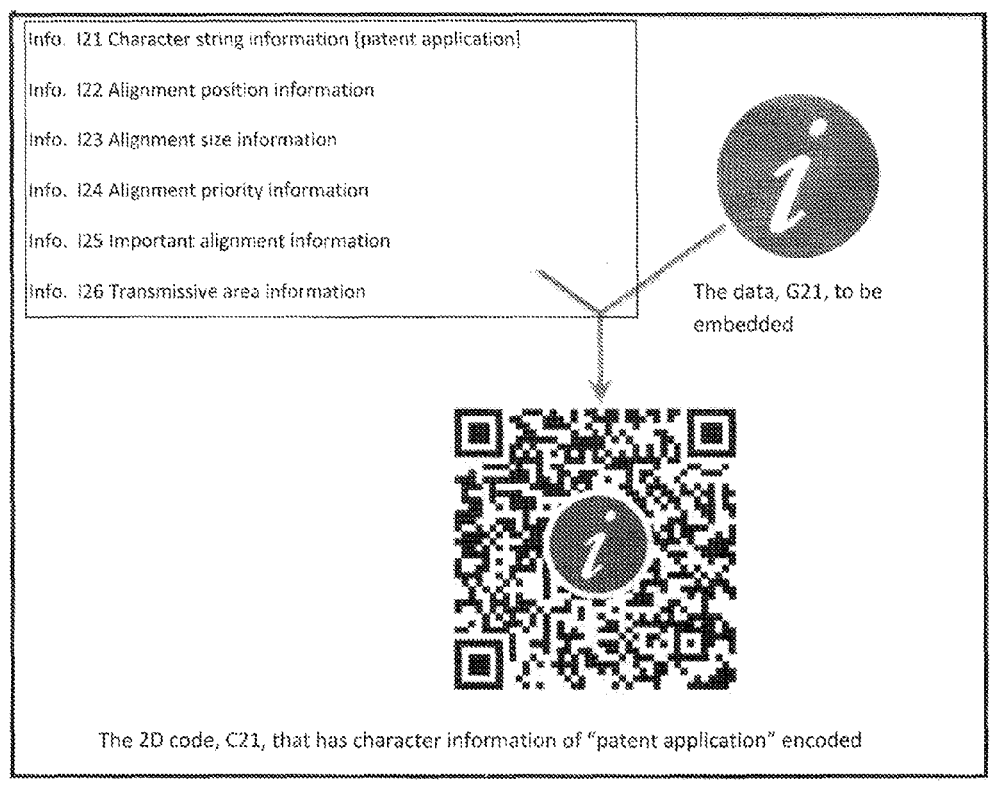
FIG. 2 illustrates a concept diagram of the 2D code output method of the first execution configuration of this invention. It conceptually shows a basic map of input information including an embedding image and the 2D code output.

FIG. 2 is a concept Figure of the 2D code generating and output method of the first execution configuration of this invention. Calculator 1 receives character string information, I21, and embedding data, G21. Then, Calculator 1 encodes the character string information, I21, and generates a 2D code. Next, Calculator 1 generates the 2D code, C21, with embedding graphic data, G21, which is embedded into the 2D code. Then, Calculator 1 outputs the generated 2D code, C21, with graphic data G21. The character string information, I21, is encoded and contained as information in the 2D code. In other words, the readout device reads the 2D code, C21 with graphic data, G21, and then decodes the 2D code, C21 to obtain the character string information, I21. The embedding data, G21, is graphic data that is intended to be embedded in the 2D code. The embedding data, G21, could be colored graphic data or black and white graphic data.

FIG. 2 shows an example of a character string, I21, as the character string "patent application", however, it can be any character or character string. Furthermore, the embedding data, G21 is a logo graphic data, but it can be any graphic data (any file format and size). The generated 2D code with graphics, C21, is a QR code, but it can be any 2D code. The QR code is a 2D code which is specified in JIS X 0510 (Japanese Industrial Standards) or ISO/IEC 18004.

Figure 3:
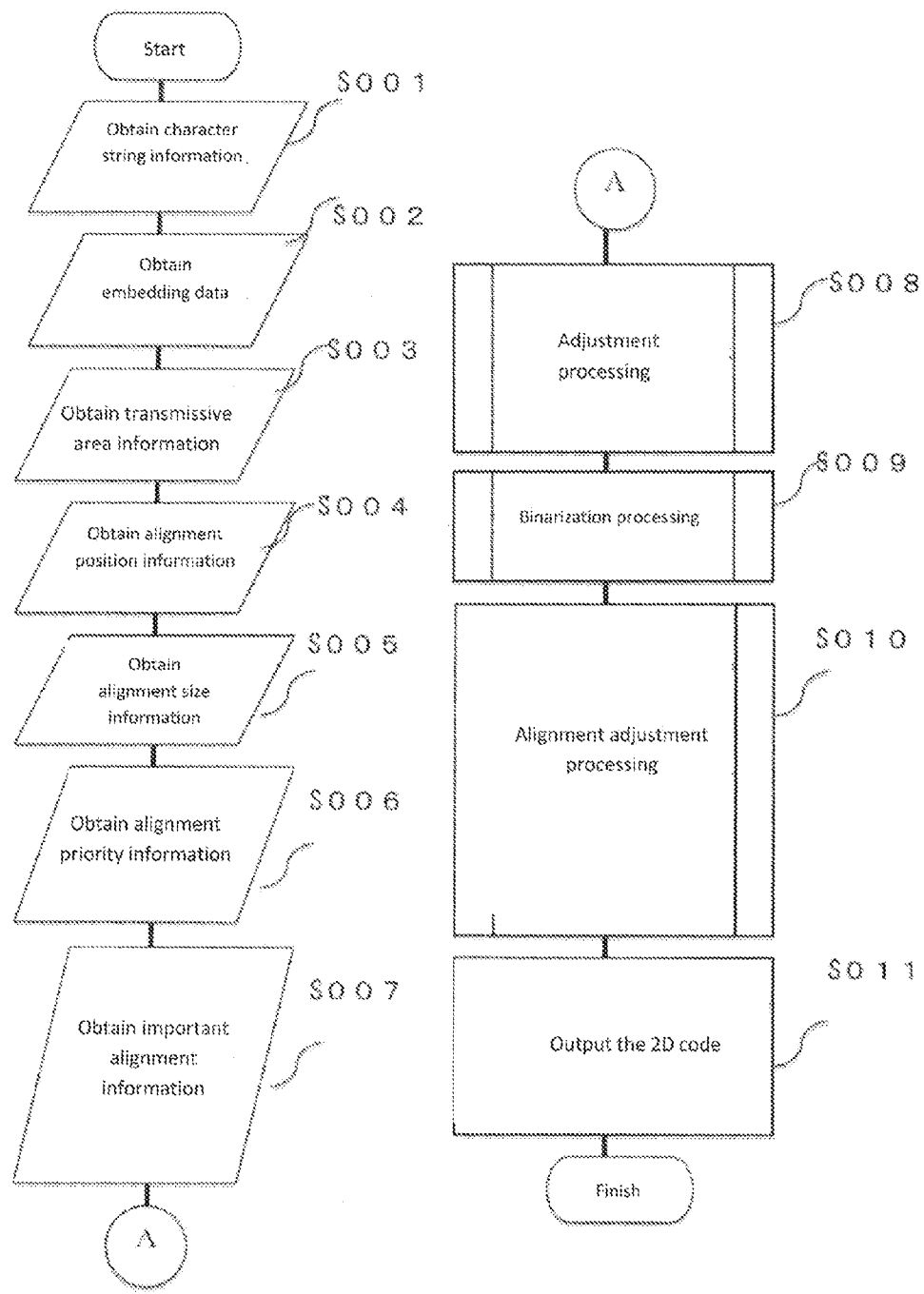
FIG. 3 illustrates a flow chart of the system processing of the calculator of the first execution configuration of this invention. It shows a basic flow chart from data input to the 2D code output.

FIG. 3 is a flow chart of the system processing of the calculator of the first execution configuration of this invention. Calculator 1 obtains the character string information, I21 (S001). Calculator 1 can obtain the character string information, I21, by any method. For example, Calculator 1 obtains the character string information, I21, from Auxiliary storage device 2, Main memory 5, Input device 6 or Communication network 8. Then, Calculator 1 encodes the character string information, I21, and generates a 2D code.

Next, Calculator 1 obtains the embedding data, G21 (S002). However, Calculator 1 can obtain the embedding data, G21, by any method. For example, Calculator 1 obtains the embedding data, G21, from Auxiliary storage device 2, Main memory 5, Input device 6 or Communication network 8.

Next, Calculator 1 obtains the transmissive area information, I26 (S003). The transmissive area information, I26, is an area which can be rendered transmissively (desired transmissive area) within the embedded data, G21. The transmissive area information, I26, can be included in the embedded data, G21, or it can be independent data from the embedding data, G21. For example, the transmissive area information, I26, can be information indicating an area of a specific color, that is a desired transmissive area. Then, Calculator 1 can obtain the transmissive area information, I26, by any method. For example, Calculator 1 obtains the transmissive area information, I26, from Auxiliary storage device 2, Main memory 5, Input device 6 or Communication network 8. However, it is optional to obtain the transmissive area information, I26, and Calculator 1 is not required to obtain the transmissive area information, I26.

Figure 4:
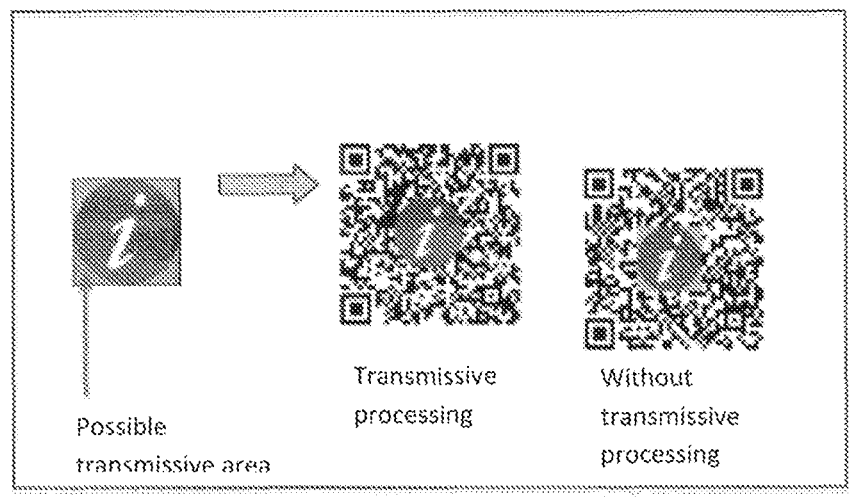
FIG. 4 illustrates an explanatory diagram of the transmissive processing of the first execution configuration of this invention. It shows images before and after transmissive processing is completed on the 2D code.
Figure 5:
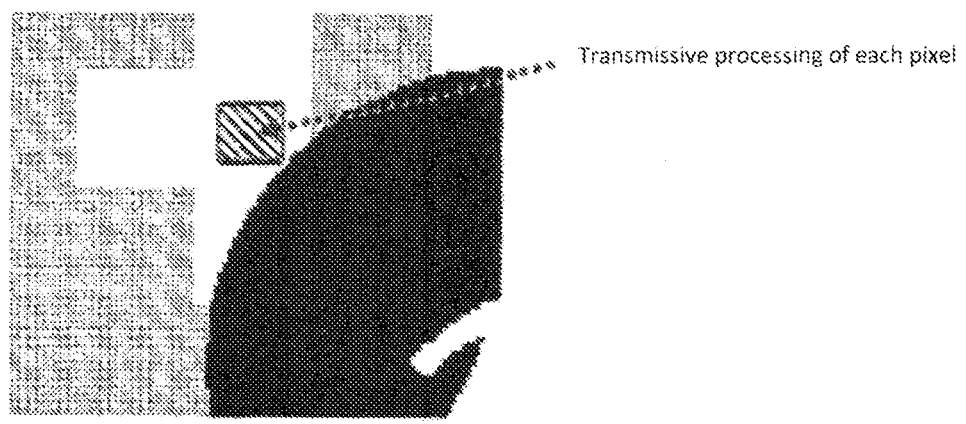
FIG. 5 illustrates an explanatory diagram of the transmissive processing of the first execution configuration of this invention.

After Calculator 1 obtains the transmissive area information, I26, it goes through a processing sequence during the transmissive processing. FIG. 4 and FIG. 5 are explanatory Figures of the transmissive processing of the first execution configuration of this invention. Calculator 1 specifies the desired transmissive area based on the transmissive information obtained. Then Calculator 1 determines if the specified possible transmissive area meets the prescribed conditions. If it meets the prescribed conditions, Calculator 1 can delete the specified possible transmissive area from the embedding data, G21, in all of the following processing. For example, when all of the specified area are included in the possible transmissive area in the 2D code, Calculator 1 deletes the possible transmissive area from the embedding data, G21, in the aforementioned specific area. Therefore, the embedded data, G21, does not cover the aforementioned specific area.

The explanation continues, going back to FIG. 3. Next, Calculator 1 obtains the alignment location or position information, I22 (S004). The alignment location information, I22, is a location where the embedded data, G21, is allocated in the 2D code. In this case, if the alignment location information, I22, indicates where the embedded data, G21, is allocated, the indicating method can be any method. For example, the alignment location information, I22, can be indicated by the number of cells incorporated in the 2D code, to, specify the location. The alignment location information, I22, can be indicated by the number of the pixels incorporated in the embedded data, G21, to specify the location. The alignment location information, I22, can be indicated by the unit of physical length, to specify the location. Calculator 1 can obtain the alignment location information, I22, by any method. For example, Calculator 1 obtains the alignment location information, I22, from Auxiliary storage device 2, Main memory 5, Input device 6 or Communication network 8. However, it is optional to obtain the alignment location information, I22, and Calculator 1 is not required to obtain the alignment location information, I22.

Next, Calculator 1 obtains the alignment size information, I23 (S005). The alignment size information, I23, is a relative size in the embedding data, G21, in the generating 2D code with graphics, C21. If the alignment size information, I23, indicates how large the embedding data, G21, is, the indicating method can be any method. The alignment size information, I23, can be indicated by the number of the cells incorporated in the 2D code, to specify the size. The alignment size information, I23, can be indicated by the number of the pixels incorporated in the embedding data, G21, to specify the size. The alignment size information, I23, can be indicated by the unit of physical length, to specify the size. Calculator 1 can obtain the alignment size information, I23, by any method. For example, Calculator 1 obtains the alignment size information, I23, from Auxiliary storage device 2, Main memory 5, Input device 6 or Communication network 8. However, it is optional to obtain the alignment size information, I23, and Calculator 1 is not required to obtain the alignment size information, I23.

Next, Calculator 1 obtains the alignment priority information, I24 (S006). The alignment priority information, I24, indicates which has the priority, the alignment location information or the alignment size information. Calculator 1 can obtain the alignment priority information, I24, by any method. For example, Calculator 1 obtains the alignment priority information, I24, from Auxiliary storage device 2, Main memory 5, Input device 6 or Communication network 8. However, it is optional to obtain the alignment priority information, I24, and Calculator 1 is not required to obtain the alignment priority information, I24.

Next, Calculator 1 obtains the important alignment information, I25 (S007). The important alignment information, I25, indicates if the embedded data, G21, can be aligned or not, in the cell (important cell) which contains important information for decoding the 2D code. What the important information for decoding the 2D code means is that it is the information that, if deficient, would have a large impact on decoding. For example, if the 2D code is a QR code, the important information in decoding the 2D code, includes position detection pattern, margin, liming pattern, separator, formatting information and alignment patterns. Furthermore, the important alignment information, I25, can indicate transmissive processing. In this case, Calculator 1 processes all of the pixels which are aligned on the important cells, with transmissive processing, in the embedding data, G21. Calculator 1 can obtain the important alignment information, I25, by any method. For example, Calculator 1 obtains the important alignment information, I25, from Auxiliary storage device 2, Main memory 5, Input device 6 or Communication network 8. However, it is optional to obtain, the important alignment information, I25, and Calculator 1 is not required to obtain the important alignment information, I25.

Next, Calculator 1 executes adjustment processing (S008). The adjustment processing is a process to improve the readout accuracy of the 2D code, C21, with graphics, by the readout device. For the adjustment processing, the details are explained in FIG. 6A, FIG. 6B and FIG. 6C.

Figure 6A:
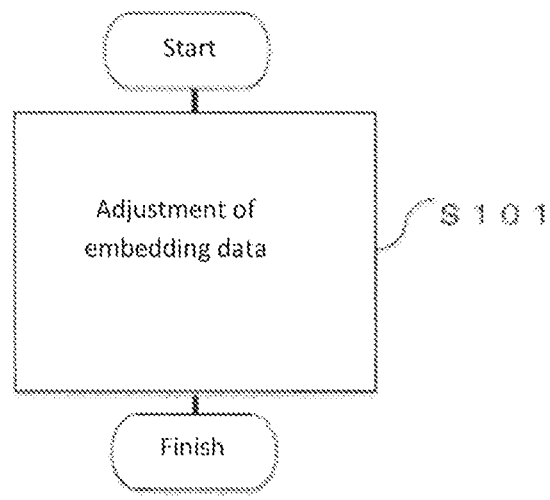
FIG. 6A illustrates a flow chart of the adjustment processing of the first execution configuration of this invention. It shows the adjustment processing of the brightness, contrast, or pigment in an embedding image, in order to improve the 2D code quality.
Figure 6B:
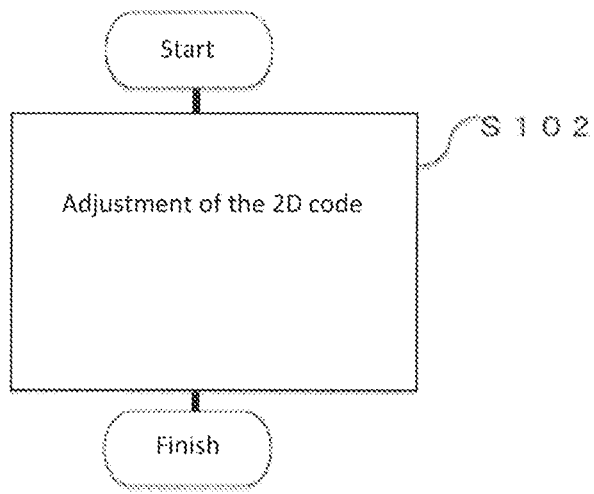
FIG. 6B illustrates a flow chart of the adjustment processing of the first execution configuration of this invention. It shows the adjustment processing of the brightness, contrast, or pigment in the 2D code, in order to improve the 2D code quality.
Figure 6C:
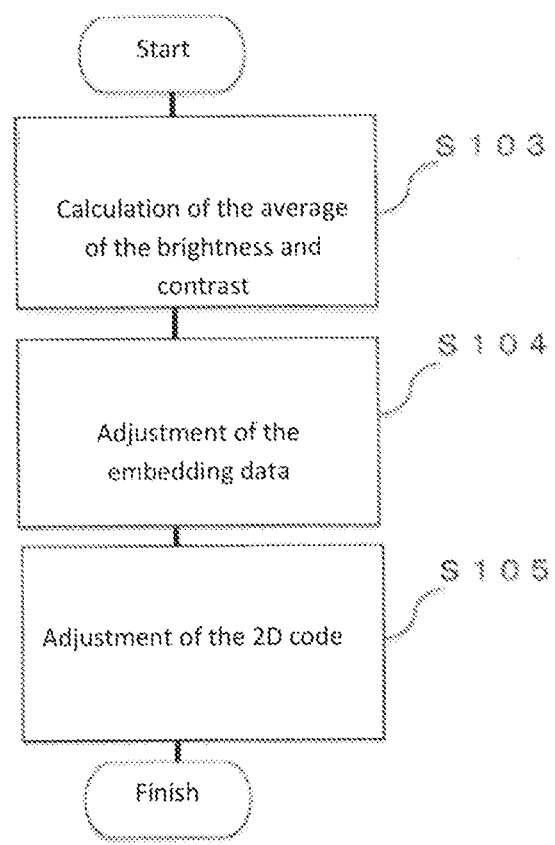
FIG. 6C illustrates a flow chart of the adjustment processing of the first execution configuration of this invention. It shows the adjustment processing of the brightness, contrast, or pigment in both an embedding image and the 2D code, in order to improve the 2D code quality.

FIG. 6A, FIG. 6B and FIG. 6C are flow charts of the adjustment processing of the first execution configuration of this invention. FIG. 6A shows a case of adjusting the embedded data only, G21. FIG. 6B shows a case of adjusting only the 2D code. FIG. 6C shows a case of adjusting both the embedding data, G21, and the 2D code. Calculator 1 determines the adjustment arbitrarily as an adjustment of only the embedding data, G21, or an adjustment of only the 2D code, or an adjustment of both the embedding data, G21, and the 2D code. If it determines to perform the adjustment processing of the embedding data, G21, only, Calculator 1 adjusts at least one of the following parameters of the obtained embedding data, G21, brightness, contrast, or pigment, using at least one of the following parameters of the generated 2D code, brightness or contrast, as a reference (S101). On the other hand, if it is determined to perform the adjustment only on the 2D code, at least one of the following parameters of the generated 2D code data is adjusted, brightness, contrast or pigment, using at least one of the following parameters of the obtained embedding data, G21, brightness or contrast as a reference (S102). However, if it is determined to perform the adjustment on both the embedding data, G21, and the 2D code, Calculator 1 calculates the average brightness value based on the generated 2D code and the brightness of the obtained embedding data, G21 (S103). Then, Calculator 1 adjusts at least one of the following parameters of the obtained embedding data, G21, brightness, contrast, or pigment, using the calculated average value of the brightness and average value of the contrast as a reference (S104). Next, Calculator 1 adjusts at least one of the following parameters of the generated 2D code, brightness, contrast, or pigment, using the calculated average value of the brightness and average value of the contrast as a reference (S105). Calculator 1 performs the adjustment processing as described above.

Now, the explanation continues, going back to FIG. 3. Next, Calculator 1 performs a binarization (black and white degradation) processing of the embedding data, G21 (S009). The details of the binarization processing will be discussed in FIG. 7.

Figure 7:
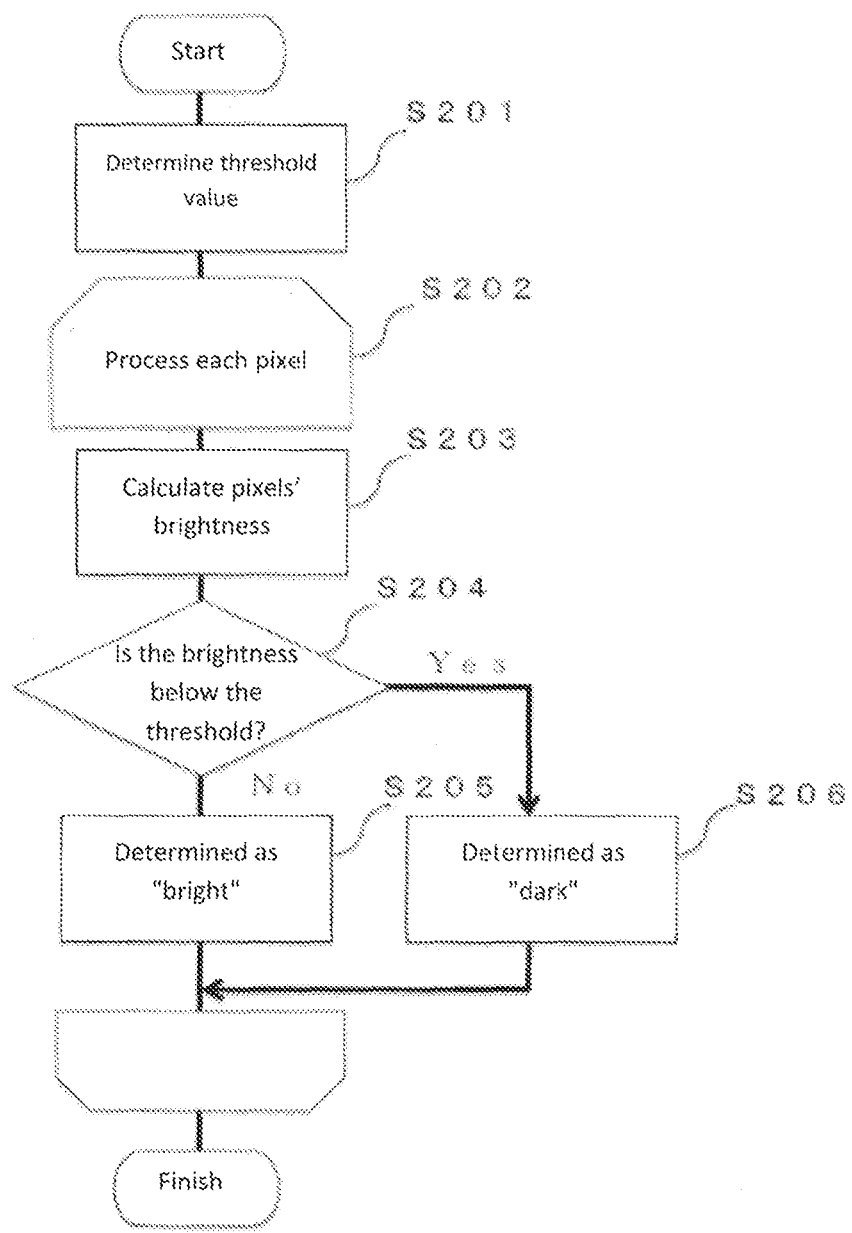
FIG. 7 is a flow chart of the binarization processing of the first execution configuration of this invention.
Figure 8:
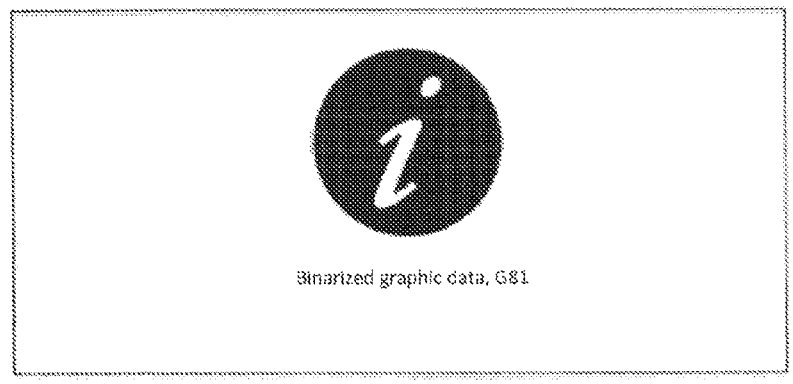
FIG. 8 is an explanatory diagram of the binarized graphic of the first execution configuration of this invention.

FIG. 7 is a flow chart of the binarization processing of the first execution configuration of this invention. And FIG. 8 is an explanatory Figure of the binarized graphic of the first execution configuration of this invention. Calculator 1 determines the threshold value to divide the light and dark areas in the obtained embedding data, G21 (S201). For example, Calculator 1 calculates the average brightness value of the obtained embedding data, G21, and the calculated average value can be used as a threshold value. Or, Calculator 1 can calculate in the following way: Calculator 1 calculates the brightness of the obtained embedding data, G21, in sequence taken from the brightest area at the designated numbers. Then, Calculator 1 calculates the average brightness value in the bright area. Then, Calculator 1 calculates the brightness of the obtained embedding data, G21, in sequence taken from the darkest area at the designated numbers. Then, Calculator 1 calculates the average brightness value in the dark area. Then, Calculator 1 can determine what the threshold value is, based on the calculation of the average brightness values of the bright and dark areas. In this way, it is possible to eliminate the effects of spiked bright areas on the described threshold value.

Then, Calculator 1 selects the pixels of the obtained embedded data, G21, in sequence, and the following processing is performed on each of the pixels (S202). Calculator 1 calculates the brightness value (S203). Then, Calculator 1 determines if the calculated brightness value is equal to or below the threshold value (S204). If the brightness value is equal to or below the threshold value, Calculator 1 determines the selected pixel to be "dark" (S206). On the other hand, if the brightness value is greater than the threshold value, Calculator 1 determines the selected pixel to be "bright" (S205). Then, Calculator 1 determines if all of the pixels in the embedding data, G21, were selected in step S202. If not all of the pixels were selected, Calculator 1 returns to step S202. Calculator 1 repeats the processing by selecting unselected pixels. On the other hand, if all the pixels were selected, Calculator 1 finishes its binarization processing. Then, Calculator 1 records the determined outcome. Specifically, it records binarized graphic data, G81, based on the graphics containing bright pixels as determined as "bright" and dark pixels as determined as "dark". Calculator 1 also records the original embedding data, G21, without binarization. Next, Calculator 1 tentatively aligns the binarized graphic data, G81, on the generated 2D code. Then, Calculator 1 uses the tentatively aligned 2D code for calculating the error rate. Then, Calculator 1 generates a 2D code with graphics, C21, by aligning the original embedding data, G21, on the 2D code, and not by aligning the binarized graphic data, G81, at the ultimate 2D code output. Furthermore, the calculation of the error rate can be done by Calculator 1, by tentatively aligning the original embedding data, G21, and not the binarized graphic data, G81.

The explanation continues, going back to FIG. 3. Calculator 1 repeats the alignment adjustment processing until the error rate of the 2D code falls equal to or below the allowable range (S010). The details of the alignment adjustment processing will be discussed in FIG. 9.

Figure 9:
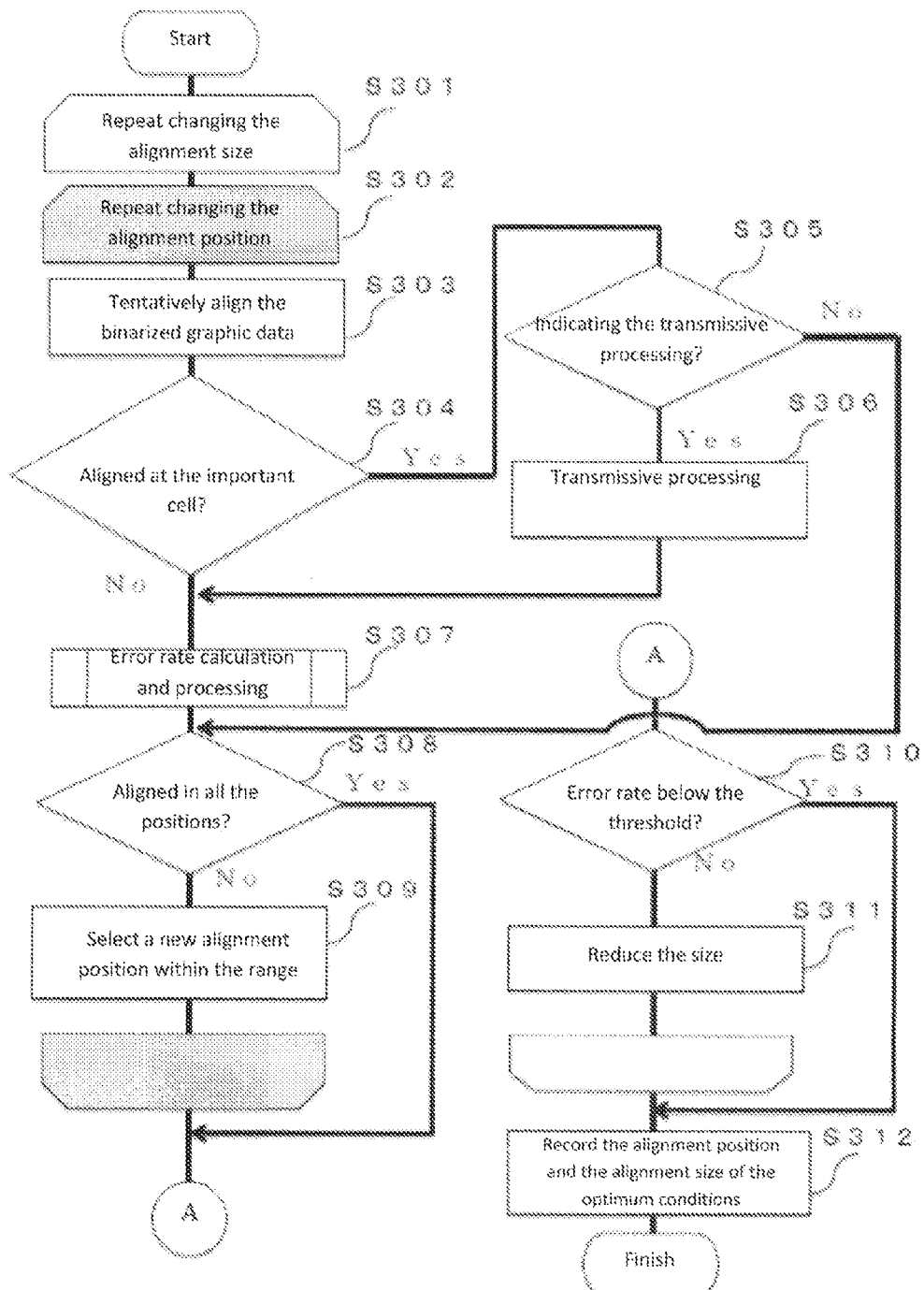
FIG. 9 illustrates a flow chart of the alignment adjustment processing of the first execution configuration of this invention. It shows a flow chart of how to determine the best alignment position with the minimal data loss.

FIG. 9 is a flow chart of the alignment adjustment processing of the first execution configuration of this invention. Calculator 1 changes the size of the binarized graphic data, G81, using the obtained alignment size information, I23 (S301). Next, Calculator 1 tentatively aligns the modified graphic data, G81, on the generated 2D code, according to the obtained alignment location information, I22 (S303). Next, Calculator 1 examines the obtained important alignment information, I25. If the obtained important alignment information, I25, indicates that the embedding data, G21, cannot be aligned at any of the important cells, then Calculator 1 determines if the graphic data, G81, is not aligned at any of the important cells (S304). If there is even one case of the graphic data, G81, aligned at an important cell, then the embedding data, G21, cannot be aligned at the alignment location. Therefore, Calculator 1 determines if the graphic data, G81, has been aligned tentatively at all of the locations within the allowable range of the 2D code (S308). If it has not been aligned tentatively, Calculator 1 selects a location where there is no tentative alignment (S309). Regarding the allowable range, it can be set beforehand, or it can be included in the alignment location information, I22. Furthermore, if the obtained alignment priority information, I24, indicates that the alignment size information, I23, has priority over the alignment location information, I22, then the allowable range refers to all of the locations in the 2D code. On the other hand, if the obtained alignment priority information, I24, indicates that the alignment location information, I22, has priority over the alignment size information, I23, then the allowable range will be limited to the locations indicated by the alignment location information, I22, or the periphery only. When Calculator 1 selects a new location, it goes back to step S302, and aligns the modified graphic data, G81, at the newly selected location (S303). Then, Calculator 1 repeats the processing. However, if all of the locations are tentatively aligned, Calculator 1 proceeds to step S310. Meanwhile, if the important alignment information, I25, indicates transmissive processing (S305), Calculator 1 performs transmissive processing on the pixels aligned at the important cells (S306). The meaning of transmissive processing is to eliminate the pixels from the embedding data, G21. Accordingly, decoding of the generated 2D code with graphics, C21, becomes possible. Next, Calculator 1 performs error rate processing (S310). The details of the error rate calculation processing will be discussed in FIG. 10. If the important alignment information, I25, indicates that the embedding data, G 21, can be aligned at the important cells, then Calculator 1 proceeds to the following step, S307, and performs the error rate calculation processing.

Figure 10:
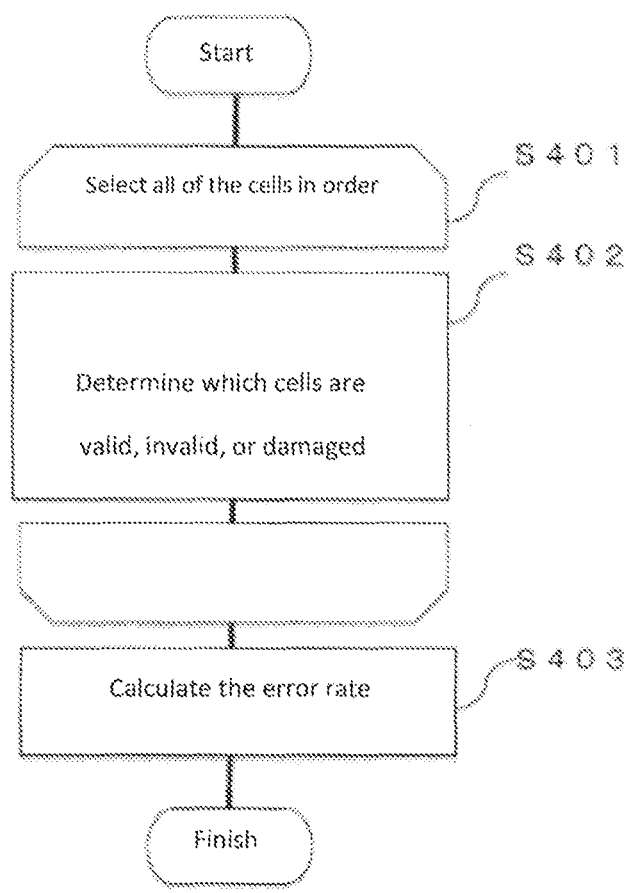
FIG. 10 illustrates a flow chart where a determination is made whether the cells are valid, invalid or damaged.
Figure 11:
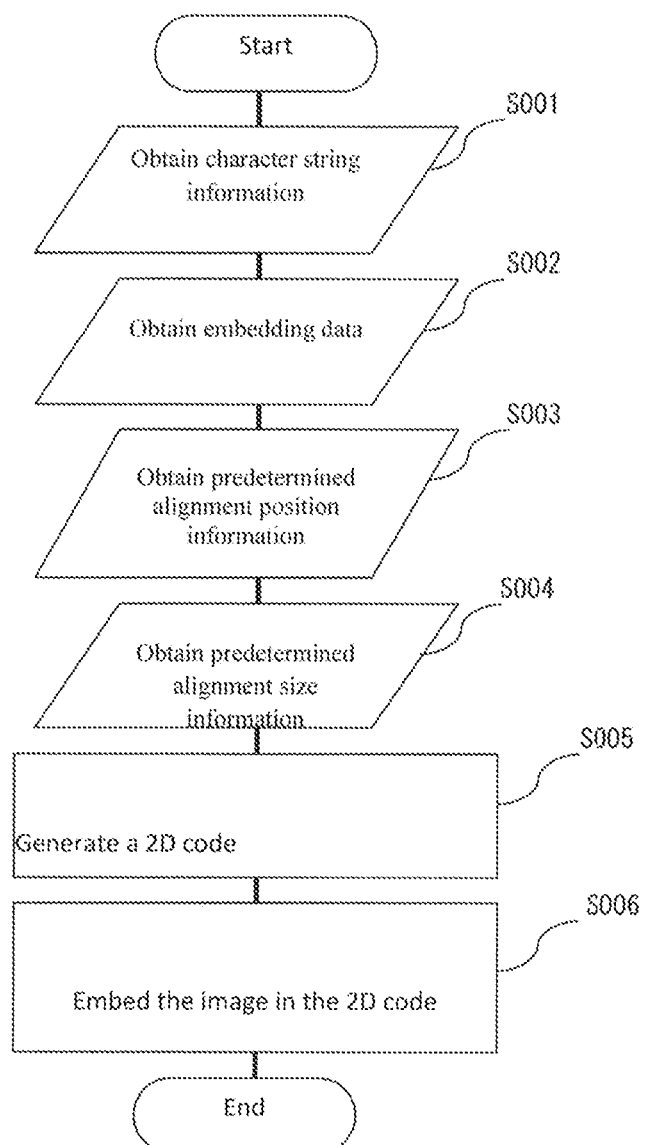
FIG. 11 illustrates embedding images of predetermined alignment position and size.

FIG. 10 is a flow chart of the error rate calculation processing of the first execution configuration of this invention. First of all, Calculator 1 selects all of the cells (except for the important cells) incorporated in the generated 2D code in sequence (S401). Next, Calculator 1 compares the selected cell with one or more pixels of graphic data, G81, tentatively aligned at the selected cell. Based on the comparison, Calculator 1 determines the selected cell to be either valid or invalid (S402). For example, if a white color (bright) cell and all of the bright pixels are selected, then Calculator 1 determines the selected cell to be valid. Similarly, when a black color (dark) cell and all of the dark pixels are selected, then Calculator 1 determines the selected cell to be valid. On the other hand, when a white color (bright) cell and all of the dark pixels are selected, then Calculator 1 determines the selected cell to be invalid. Similarly, when a black color (dark) cell and all of the bright pixels are selected, Calculator 1 determines the selected cell to be invalid. Furthermore, Calculator 1 determines a cell to be invalid when a portion of the pixels tentatively aligned at the selected cell are bright, and a portion of the remaining pixels are dark. If the selected cell is white (bright) and it has more than a specific number of bright pixels, then Calculator 1 can determine that cell to be valid. Similarly, if the selected cell is black (dark), and it has more than a specific number of dark pixels, then Calculator 1 can determine the selected cell to be valid. And when the selected cell is white (bright), and in the specific central area of the selected cell, the tentatively aligned pixels are all bright, then Calculator 1 determines that cell to be valid. Similarly, when the selected cell is black (dark), and in the specific central area of the selected cell, the tentatively aligned pixels are all dark, then Calculator 1 determines that cell to be valid. If the selected cell has no graphic data, G81, tentatively aligned, then Calculator 1 determines the selected cell to be valid. If the selected cell has tentatively aligned pixels with a transmissive processing, then Calculator 1 determines the selected cell to be valid. The reason being, that the pixels which are processed transmissively have been eliminated from the embedded data, G21. Next, Calculator 1 determines whether all of the cells (except for the important cells) have been selected or not, in step S401. When all of the cells (except for the important cells) have not been selected, Calculator 1 returns to step S401, and repeats the processing. When all of the cells (except for the important cells) have been selected, Calculator 1 calculates the error rate based on the outcome of step S402 (S403). For example, Calculator 1 calculates the error rate by dividing the number of invalids by the total number of the cells. The error rate can also be calculated by Calculator 1, by dividing the number of invalids by the total number of invalids and valids.

The explanation continues, going back to FIG. 9. Next, Calculator 1 determines if the graphic data, G81, is tentatively aligned at all of the locations within the allowable range of the 2D code (S308). If it is not tentatively aligned at all of the locations, Calculator 1 selects a location where it is not tentatively aligned within the allowable range (S309). The allowable range can be set beforehand, or it can be incorporated in the alignment location information, I22. If the obtained alignment priority information, I24, indicates that the alignment size information, I23, has priority over the alignment location information, I22, then the allowable range will be all of the locations within the 2D code. On the other hand, if the obtained alignment priority information, I24, indicates that the alignment location information, I22, has priority over the alignment size information, I23, the allowable range will be limited to the locations indicated by the alignment location information, I22, or the periphery only. When Calculator 1 selects a new location, it goes back to step S302, and tentatively aligns the modified graphic data, G81, in the newly selected location (S303). Then, Calculator 1 repeats the processing. However, if all of the locations were tentatively aligned, Calculator 1 selects the smallest error rate among all of the calculated error rates. Next, Calculator 1 compares the selected error rate to the threshold value (S310). Then, Calculator 1 determines if the error rate is equal to or below the threshold value. If the error rate is greater than the threshold value, Calculator 1 cannot align the embedded data, G21, as is. Then Calculator 1 reduces the size of the graphic data, G81, to the specified size (S311). The specified size could be the size of one pixel, or could be a predetermined size. Then, Calculator 1 returns to step S301 and repeats the processing. On the other hand, if the error rate is equal to or below the threshold value, Calculator 1 records the selected alignment location information and the alignment size information with the smallest error rate (S312). However, Calculator 1 can also select the optimum alignment location and alignment size, referring to the error rate and the alignment location and alignment size, and can record the selected alignment location and alignment size. Then, Calculator 1 embeds the original embedded data, G21, in the 2D code, according to the selected alignment location and alignment size. Also, if transmissive processing was performed during the tentative alignment, then Calculator 1 performs transmissive processing on the original embedding data, G21. Then, Calculator 1 embeds the original embedding data, G21, that has been transmissively processed, G21, in the 2D code. Accordingly, Calculator 1 generates the 2D code, C21, with graphics. And Calculator 1 records the 2D code, C21, with graphics. In the meantime, Calculator 1 is able to direct Output device 7 to output the generated 2D code, C21, with graphics, or send it to other calculators via Communication network 8.

According to the first execution configuration of this invention, Calculator 1 is able to output the 2D code, C21, with graphics, which satisfies error rate criteria, after obtaining the character string information, I21 and the embedding data, G21. The 2D code, C21, with graphics, is a 2D code containing the character string information that human eyes can infer without decoding the 2D code.

EXPLANATION OF THE CODES

1. Calculator (device or electronic computer)
2. Auxiliary storage device
3. Program
4. CPU
5. Main memory
6. Input device
7. Output device
8. Communication network The present invention provides machine-generated, customizable and configurable image insertion system (processor and internet-based processes) where the location orientation for the image insertion on the code can be pre-fixed in order to automate image uploads (and through importing images from third party sites) of a specific pre-fixed size (i.e. image to code ratio) in order to maximize readability."

The 2D code can be generated directly from the obtained character string information, or it can be generated by first reducing the obtained character string information. FIG. 12 provides an example where a character string information is shortened. The reducing of the character string information can be done while still maintaining the same information as the pre-existing 2D code, e.g., In case of an URL being encoded, a person scanning the code would be directed to the same website despite encoding for a shortened URL that is different from the original URL.

The image can be embedded on the 2D code so that the image covers part of the 2D code. The 2D code, however, can still be decoded despite the image being placed on the 2D code. In this embodiment, the length of character string information to be encoded for the 2D code needs not necessarily be reduced.

No matter whether the character string information for the code is reduced or not, the device takes into account a combination of factors particularly the number of characters for the code, size of the image and orientation of the image to reduce error correction and increase readability of the 2D code. FIG. 13 illustrates the device taking into account character string information in allowing where an image can be placed on the 2D code. Based on the number of the character string information, some areas are blocked for placing an image. A person can then select of the available areas, which location on the code provides the best option for placing the image. The system creates a "fenced in area" wherein an image can be dropped anywhere within in addition to the size of the image itself being configured to be as big as the "fenced in area" or as small as desired and then dropped anywhere within the "fenced in area". This "fenced in area" can also be reduced and/or oriented/aligned by the system in a pre-determined manner which would provide users less latitude/options regarding the image placement position. Additionally, the system can pre-determine the requisite size of the image as well, effectively arriving at the pre-determined location and pre-determined size. Thus, the system has maximum range and flexibility with regard to the "automated-design of 2D codes" due to its customizability as well as pre-configurability by an administrator or end-user or consumer. The "fenced in area" represents the maximum area available to increase readability with a superior scanner such as a smartphone camera with 3 to 6 Megapixels. The 1/9 ratio coupled with a center-alignment is the maximum size for readability for feature phones and smartphone cameras that may be of less quality (like 1.2 to 2 Megapixels versus 3 to 6 Megapixels).

The device can encompass a self-service 2D code tool/application/software, preferably QR, where the automated and machine generated nature of the 2D codes embedded with images allows a person to automatically embed a desired image. The machine-driven application software allows self-service creation of 2D codes that feature embedded images.

The device can comprise a memory for storing a program to be executed by a processor and an interface that facilitates viewing a 2D code with an embedded image. Instead of a memory, the device can obtain character string information or even graphic data through the Internet or other networks.

The image can be any visual sign that is different than the 2D code and allows a person who views the image to appreciate that any visual sign has been embedded. The image can include at least one of a letter or number or combination, multiple letters or initials or numbers or combinations, a word, a keyboard symbol (%, $, @), an icon, an emblem, a shape, a design, a logo, a trademark, a face, an avatar, a picture, a brand, a number, a plurality of numbers, and combinations thereof. The character string information can include one or more of the following characters: numeric digits, alphabetic characters, symbols (SP, $, %, *, +, -, ., /, :), 8-bit Latin/Kana characters and Kanji characters.

The ratio of space covered by the embedded image compared to the code is preferably about 1/3 to about 1/12, more preferably about 1/9. The code with the embedded image can have about 0 to about 100 characters, or about 0 to about 50 characters. The 2D code can be preferably a QR code.

The graphic data can be input in a format selected from the group consisting of jpg, bmp, gif, png, psd, eps, and ai. Han original image is a vector image, the device can change the file format into a raster image or bmp format. The image embedded in the 2D code (i.e., graphic data output with 2D code) can be output in a format selected from the group consisting of eps, png, ai, gif, bmp, pdf, psd, jpg, and tiff. The device can give the consumer/customer a choice or output as a bmp file. More than 120 pixels on a side are recommended in use on the Internet, in terms of code output and the following formats: jpg, png, or gif are recommended. In print media, the following format outputs of the codes are recommended: eps, psd, ai, bmp, or jpg. The preferable minimum output for the codes is 600 dpi and 1.182 inch (3 cm).

In another embodiment, an image of a predetermined size and alignment is embedded at a predetermined location in the 2D code, wherein the image is of a size and alignment that allows for the code to be decoded properly. This predetermination of size and alignment allows for mass producing the codes with the embedded images without readjusting the image each time an image is embedded. The images that are mass produced can be same or different, and still have the same size and optionally alignment. For example, unrelated images A, B, and C can be made of the size and alignment, for example 1/9 and upright, respectively. A customer can give an order for particular 2D codes with different images. The codes would be generated so that the image A, B, and C are embedded automatically in the codes without the need to individually for each embedding to check size, alignment, or location of the images. The method can also be done with the same image, where a customer orders a plurality of for example image A. This embedding of an image with a predetermined size, alignment, and/or location is illustrated in FIG.

11. The codes that are mass produced can be the same or different. The device can generate both a plurality of same codes and plurality of different codes, with the same or different images having the same size and alignment. The images can be produced with the same maximum size possible without substantially diminishing the accuracy of decoding the 2D codes. For example, all the images would be made so to be 1/9 size, with the code covering the rest of 8/9.

The device in addition to embedding an image, it can configure the cell colors and background colors to compliment the image or just to make the code any color picked by a person or company that seeks to generate this code by using the automated machine generated process. This personalization of formerly mundane, generic, black and white 2D codes with colors give the codes life or vibrancy in addition to further complimenting the embedded image. When the code size is used below 160×160 pixel or 1.5×1.5 cm, some code scanning problems could occur with some scanning readers (apps/scanners). The scanning problems could happen to standard 2D codes as well as QR codes with embedding images. Generated code can be resizable to any size as a consumer likes. It is best to refrain from reducing the code size to 160×160 pixels or 1.5×1.5 cm or less. When resizing a code, it is best not to produce the following phenomena: One of cells would appear as a rectangle shape, though the cells are normally square-shaped; The code image is rough around the edges. Anti-aliasing functionality may be activated on the image editing software such as Adobe Photoshop, so that the code image may become a blurred image.

In the print media, the following may be considered: Improving the printing quality (in order not to produce too dark/light/pale color, or discolored, and the change in shade in the process of printing). Regarding the method of printing, the offset printing or gravure printing would be preferable for the 2D codes. In case of other printing methods, test printings in advance is recommended. Regarding the printing paper, more than 85% whiteness on the whiteness measurement is recommended. Avoiding poor-quality papers such as the coarse or ground-wood paper is recommended. For using the code in planar media (flat surface), it is recommended to refrain from using distorted or curved media, as well as the use of reflective materials (mirrors, silver item and etc.) as well as the uneven (non-flat) surface. When the code is normally printed, a cell (dot) size can have at least 0.35 mm or more to detect each cell with scanning readers (scanners). It is best to retain margin (quiet zone around the code) that is equivalent to a four-cell space or more. It is better to have more margins (over 8-cell space would be preferable), if printing papers (media) are not the white color; the code background or surrounding is covered with some dark colors (eg. black); or the code color is changed.

For digital media, display (shown) the code in the center of the screens as large as possible, if you use the code on the screens such as personal computer, public TV, or digital signage. The light emanated from the screen surface may cause the code scanning to become difficult. Also, if the code is the small size, the camera mobile phone has to move closer to the screen surface (code). It means that the light-emitting from the screen directs against the mobile camera, so that the reader (scanner) may receive the direct light. That would raise the possibility of code scanning troubles. Consider the screen aspect ratio, if the code is used for several kinds of screens. The aspect ratio may differ, according to each screen. It is recommended that the encoded information should be showed near the code. Alternatively, more than two codes should be prepared for such a problem. If the code is inserted into the video or movie, it is better to take the preparation time for users to scan the code into account. It is better that the code should be displayed for a long time.

What is claimed is:

1. A system for producing a 2D (2 Dimensional) code with an embedded image for an automated machine generated process, comprising a processor that produces the 2D code with an embedded image by:
    i) obtaining character string information to be encoded for the 2D code;
    ii) obtaining a first graphic data to be embedded in the 2D code;
    iii) generating the 2D code by encoding the obtained character suing information;
    iv) binarizing pixels of bright and dark areas in the first graphic data to obtain a second graphic data;
    v) adjusting an alignment location and an alignment size of the second graphic data in the generated 2D code;
    vi) tentatively aligning the second graphic data in the generated 2D code, according to the adjusted alignment location and the alignment size;
    vii) calculating an error rate of the 2D code which has the second graphic data tentatively aligned;
    viii) repeating the fifth to the seventh steps until the error rate becomes equal to or lower than a first threshold value; and
    ix) determining the alignment location and the alignment size of the second graphic data by referring to the calculated error rate.

2. A system as described in claim 1, wherein the system further aligns the second graphic data in the generated 2D code, based on the determined alignment location and alignment size of the second graphic data, and outputs the 2D code which has the image embedded.

3. A system as described in claim 1, further comprising outputting the 2D code with the embedded image.

4. A system as described in claim 1, wherein producing the 2D code with the embedded image comprises:
    i) an interface and memory for receiving the character string information and the first graphic data; and
    ii) the processor for encoding the character string information into the 2D code, generating the alignment location for the second graphic data, adjusting the alignment location for the second graphic data, regenerating the alignment location for the second graphic data to reduce the error rate in the aligned 2D code, outputting the generated 2D code with the embedded image according to the generated alignment location.

5. A system as described in claim 1, wherein producing the 2D code with the embedded image comprises:
    i) an interface and memory for receiving the character string information and the first graphic data; and
    ii) the processor for encoding the character string information into the 2D code, generating the alignment size for the second graphic data, adjusting the alignment size for the second graphic data, regenerating the alignment size for the second graphic data to reduce the error rate in the aligned 2D code, outputting the generated 2D code with the embedded image according to the generated alignment size.

6. A system as described in claim 1, wherein the system binarizes the first graphic data using a second threshold value.

7. A system as described in claim 6, wherein the system calculates the error rate, using the tentatively aligned second graphic data in the 2D code, to determine each cell to be valid or invalid, each cell referring to a minimum structural unit in the 2D code.

8. A system as described in claim 7, wherein the 2D code is a QR code.

9. A system as described in claim 1, further comprising determining whether the alignment location or the alignment size has priority.

10. A system as described in claim 1, further comprising determining if the second graphic data is aligned in comparison to the generated 2D code.

11. A system as described in claim 1, further comprising the step of determining whether the generated 2D code can be decoded prior to output.

12. A system as described in claim 1, further comprising deleting a specified area from the embedded image when the second graphic data is tentatively aligned on the generated 2D code.

13. A system as described in claim 1, wherein the 2D code is generated by first reducing the obtained character string information.

14. A system as described in claim 13, wherein the reducing still maintains the same information as the obtained character string information.

15. A system as described in claim 1, further comprising a memory for storing a program to be executed by a processor and an interface that facilitates viewing a 2D code with an embedded image.

16. A system as described in claim 1, wherein the image is selected from the group consisting at least one of a letter or number or combination, multiple letters or initials or numbers or combinations, a word, a keyboard symbol, an icon, an emblem, a shape, a design, a logo, a trademark, a face, an avatar, a picture, a brand, a number, a plurality of numbers, and combinations thereof.

17. A system as described in claim 1, wherein ratio of space covered by the image compared to the code is about 1/2 to about 1/9.

18. A system as described in claim 1, wherein the code has less than 100 characters.

19. A system as described in claim 1, wherein the code has less than 50 characters.

20. A system as described in claim 1, wherein the code is a QR (Quick Response) code.

21. The system as described in claim 1, wherein the first graphic data is input in a format selected from the group consisting of jpg (Joint Photographic Experts Group), bmp (Bitmap Image File), gif (Graphics Interchange Format), png (Portable Network Graphics), psd (Photoshop Document), eps (Encapsulated PostScript), pdf (Portable Document Format), tiff (Tagged Image File Format), and ai (Adobe Illustrator).

22. The system as described in claim 1, wherein the image is output in a format selected from the group consisting of eps (Encapsulated PostScript), png (Portable Network Graphics), ai (Adobe Illustrator), (Graphics Interchange Format), bmp (Bitmap Image File), pdf (Portable Document Format), psd (Photoshop Document), jpg (Joint Photographic Experts Group), and tiff (Tagged Image File Format).

23. A system as described in claim 1, wherein the character string information to be encoded for the 2D code is obtained from the Internet or other networks.

24. A system as described in claim 1, wherein the system takes into account a number of characters fix the code, size of the image and orientation of the image to reduce error correction and increase readability of the 2D code.

25. A system as described in claim 1, wherein the character string information includes one or more attic following characters: numeric digits, alphabetic characters, symbols, 8-bit Latin/Kana characters and Kanji characters.

26. A method as described in claim 1, wherein ratio of space covered by the image compared to the code is about 1/2 to about 1/12.

27. A method for producing a 2D (2-Dimensional) code with an embedded image by an automated machine generated process, comprising embedding an image in the 2D code while allowing the 2D code to be decoded, comprising,
   i) obtaining character string information to be encoded for the 2D code;
   ii) obtaining a first graphic data to be embedded in the 2D code;
   iii) generating the 2D code by encoding the obtained character string information;
   iv) binarizing pixels of bright and dark areas in the first graphic data to obtain a second graphic data;
   v) adjusting an alignment location and an alignment size of the second graphic data in the generated 2D code;
   vi) tentatively aligning the second graphic data in the generated 2D code, according to the adjusted alignment location and alignment size;
   vii) calculating an error rate of the 2D code which has the second graphic; data tentatively aligned;
   viii) repeating the fifth to the seventh steps until the error rate becomes equal to or lower than a first threshold value; and
   ix) determining the alignment location and the alignment size of the second graphic data by referring to the calculated error rate,
   wherein each step is performed by a processor.

28. A method according to claim 27, comprising:
   receiving the character string information and the first graphic data with an interface and memory, encoding with the processor the character string information into a 2D code, generating with the processor the alignment location of the second graphic data, adjusting with the processor the alignment location of the second graphic data or the image, regenerating with the processor the alignment location of the second graphic data, calculating with the processor the error rate in the generated 2D code, embedding with the processor the image according to the generated alignment location, and outputting with the processor the generated 2D code with the embedded image.

29. A method as described in claim 27, further comprising aligning the second graph data in the generated 2D code, based on the determined alignment location and the alignment size of the second graphic data, and outputting the 2D code which has the image embedded.

30. A method as described in claim 27, further comprising outputting the 2D code with the embedded image.

31. A method as described in claim 27, wherein producing the 2D code with an embedded image comprises:
   i) receiving, the character string information and the first graphic data with an interface and memory;
   ii) encoding with a processor the character string information into a 2D code, generating with the processor the alignment size for the second graphic data, adjusting with the processor the alignment size for the second graphic data, regenerating with the processor the alignment size for the second graphic data to reduce the error rate in the aligned 2D code, outputting with the processor the generated 2D code with the embedded image according to the generated alignment size.

32. A method as described in claim 27 wherein producing the 2D code with the embedded image comprises:
   i) receiving the character string information and the first graphic data with an interface and memory;

ii) encoding with the processor character string information into a 2D code, generating with the processor the alignment location for the second graphic data, adjusting with the processor the alignment location for the second graphic data, regenerating with the processor the alignment location for the second graphic data to reduce the error rate in the aligned 2D code, outputting with the processor the generated 2D code with the embedded image according to the generated alignment location.

33. A method as described in claim 27, wherein the step of binarizing the first graphic data is carried out by using a second threshold value.

34. A method as described in claim 27, further comprising calculating the error rate using the tentatively aligned second graphic data in the 2D code to determine each cell to be valid or invalid, each cell referring to a minimum structural unit in the 2D code.

35. A method as described in claim 27, wherein the 2D code is a QR (Quick Response) code.

36. A method as described in claim 35, further comprising determining whether the alignment location or the alignment size has priority.

37. A method as described in claim 27, further comprising determining if the second graphic data is aligned in comparison to the generated 2D code.

38. A method as described in claim 27, further comprising a step of determining whether the generated 2D code can be decoded prior to output.

39. A method as described in claim 27, further comprising deleting a specified area from the embedded image when the second graphic data is tentatively aligned on the generated 2D code.

40. A method as described in claim 27, further comprising first reducing the obtained character string information before generating the 2D code.

41. A method as described in claim 40, wherein the reducing still maintains the same information as the obtained character string information.

42. A method as described in claim 27, further comprising storing a program on a memory to be executed by a processor and facilitating with an interface viewing of a 2D code with an embedded image.

43. A method as described in claim 27, wherein the image is selected from the group consisting at least one of a letter or number or combination, multiple letters or initials or numbers or combinations, a word, a keyboard symbol, an icon, an emblem, a shape, a design, a logo, a trademark, a face, an avatar, a picture, a brand, a number, a plurality of numbers, and combinations thereof.

44. A method as described in claim 27, wherein ratio of space covered by the image compared to the code is about 1/2 to about 1/9.

45. A method as described in claim 27, wherein the code has less than 100 characters.

46. A method as described in claim 27, wherein the code has less than 50 characters.

47. A method as described in claim 27, wherein ratio of space covered by the image compared to the code is about 1/2 to about 1/12.

48. A method for producing a 2D (2 Dimensional) code with an embedded image for an automated machine generated process, comprising a processor that produces the 2D code with an embedded image by:
   i) obtaining character string information to be encoded for a 2D code;
   ii) obtaining a first graphic data to be embedded in the 2D code,
   iii) generating the 2D code by encoding the obtained character string information;
   iv) binarizing pixels of bright and dark areas in the first graphic data to obtain a second graphic data;
   v) adjusting an alignment location and an alignment size of the second graphic data in the generated 2D code;
   vi) tentatively aligning the second graphic data in the generated 2D code, according to the adjusted alignment location and alignment size;
   vii) calculating an error rate of the 2D code which has the second graphic data tentatively aligned using the tentatively aligned second graphic data in the 2D code to determine each cell to be valid or invalid, each cell referring to a minimum structural unit in the 2D code.

49. The method of claim 48, wherein the 2D code is QR code.

50. A method for producing a 2D (2 Dimensional) code with an embedded image for an automated machine generated process, comprising a processor that produces the 2D code with an embedded image by:
   i) obtaining character string information to be encoded for a 2D code;
   ii) obtaining graphic data to be embedded in the 2D code;
   iii) generating the 2D code by encoding the obtained character string information;
   iv) determining whether alignment location or alignment size has priority; and
   v) adjusting the alignment location and the alignment size of the graphic data in the generated 2D code based on the determining Step iv.

51. A method as described in claim 50, further comprising binarizing the graphic data before carrying out the adjusting.

* * * * *

UNITED STATES PATENT AND TRADEMARK OFFICE
CERTIFICATE OF CORRECTION

PATENT NO. : 8,783,571 B2
APPLICATION NO. : 13/286137
DATED : July 22, 2014
INVENTOR(S) : Koji Sakahashi and Bryan Scott Schaffner It is certified that error appears in the above-identified patent and that said Letters Patent is hereby corrected as shown below:

Column 9, line 3, "liming pattern" should be replaced with --lining pattern--.

Column 14, line 36, "Han" should be replaced with --If--;
line 43, "or" should be replaced with --of--;
line 57, "optionally" should be replaced with --optically--.

Column 16, line 14, "suing" should be replaced with --string--.

Column 17, line 61, "fix the code" should be replaced with --of the code--.

Signed and Sealed this
Fifth Day of July, 2016

Michelle K. Lee
*Director of the United States Patent and Trademark Office*